ated to U.S. Department of
United States Patent [19]

Lloyd

[11] 4,397,778

[45] Aug. 9, 1983

[54] COPROCESSED NUCLEAR FUELS CONTAINING (U, PU) VALUES AS OXIDES, CARBIDES OR CARBONITRIDES

[76] Inventor: Milton H. Lloyd, Oak Ridge, Tenn., granted to U.S. Department of Energy under the provisions of 42 U.S.C. 2182

[21] Appl. No.: 223,547

[22] Filed: Jan. 9, 1981

[51] Int. Cl.³ .............................................. G21C 19/46
[52] U.S. Cl. .................................. 252/627; 252/634; 252/635; 252/642; 252/643
[58] Field of Search ............... 252/634, 635, 627, 642, 252/643

[56] References Cited

U.S. PATENT DOCUMENTS 3,862,908  1/1975  Fitch et al. ........................... 252/635
4,231,976  11/1980  Bischoff et al. ...................... 252/635
4,278,559  7/1981  Levenson et al. ....................... 423/4

OTHER PUBLICATIONS

Bischoff et al., "Sol-Gel Process for Carbide Production", EIR Report No. 236 (1973).

*Primary Examiner*—Deborah L. Kyle
*Attorney, Agent, or Firm*—C. Clay Carter; Stephen D. Hamel; Richard G. Besha

[57] ABSTRACT

Method for direct coprocessing of nuclear fuels derived from a product stream of a fuels reprocessing facility containing uranium, plutonium, and fission product values comprising nitrate stabilization of said stream vacuum concentration to remove water and nitrates, neutralization to form an acid deficient feed solution for the internal gelation mode of sol-gel technology, green spherule formation, recovery and treatment for loading into a fuel element by vibra packed or pellet formation technologies.

4 Claims, No Drawings

COPROCESSED NUCLEAR FUELS CONTAINING (U, PU) VALUES AS OXIDES, CARBIDES OR CARBONITRIDES

This invention is the result of a contract with the U.S. Department of Energy.

FIELD OF THE INVENTION

The present invention relates to the art of nuclear fuels reprocessing generally and, more specifically, to the direct co-conversion to loadable fuel forms of uranium and plutonium values of a product stream from a reprocessing facility. As a process, mixed (U, Pu) fuels in the oxide, carbide, or carbonitride forms can be prepared.

BACKGROUND OF THE INVENTION

With the advent of the liquid-metal-cooled fast breeder reactor and similar technologies has come a renewed emphasis on the successful recovery, reprocessing, and recycling of valuable fuel components of expended nuclear fuel elements. The term nuclear fuel as used herein shall include both fissile values ($U^{233}$, $U^{235}$, $Pu^{239}$, and their compounds) and fertile values ($U^{288}$, $Th^{232}$ and their compounds), or mixtures of both. This is necessary because a nuclear fuel may be comprised entirely of one form or a mixture of both forms, dependent upon the particular fast reactor application and the technology employed.

In the reprocessing of nuclear fuels, the expended fuel rods from civilian or military reactors and other institutional sources are periodically withdrawn and transferred to reprocessing facilities. At such a facility, the rods are sheared to predetermined lengths and their contents dissolved in nitric acid producing a resultant aqueous solution containing fission product values, uranium, plutonium, and thorium among other materials.

This aqueous solution is treated with an organic solvent by solvent extraction techniques to separate and purify the recyclable fuel forms from fission product wastes. A detailed description of such purification processes may be found in *Engineering for Nuclear Fuel Reprocessing*, Justin T. Long, Gordon and Beach Science Publishers, Inc., New York, New York (1967), which is herein incorporated by reference, under such headings as the "purex", "25", "redox", and "butex" process descriptions.

Nuclear fuel reprocessing facilities generally involve the use of separate purification streams for each of the nuclear fuel components received. Once isolated and refined, the uranium, plutonium, and other nuclear fuel components are recombined in a fuels fabrication operation to produce a mixed nuclear fuel. These fuels are then loaded into fuel rods as either pellets or vibration-packed spherules.

A recent publication has described such a process wherein (U,Pu)C spherules are prepared by separate concentration and denitration procedures for hexavalent uranium and tetravalent plutonium. Bischoff, M., et al, "Sol-Gel Processes for Carbide Preparation," IAEA Panel on Sol-Gel Process for Fuel Fabrication, Vienna, May 21-24, 1973, EIR-Bericht Nr.236. The uranium is individually processed therein by conventional denitration techniques known in the art to produce an acid deficient uranium solution. A less conventional procedure is utilized to produce a plutonium solution involving addition of hydroxide form of an anion exchange resin to an individually processed plutonium nitrate stream followed by vacuum distillation to remove nitric acid and water. The resultant plutonium solution is suitable for mixing with the uranium solution and predetermined amounts of sol, urea, carbon and hexamethylenetetramine (HMTA) to create an acceptable sol-gel feed broth. The solutions and feed broth are stabilized by chilling to about 0° C.

Separate purification systems have several inherent disadvantages. Such processes are expensive, create unnecessary waste streams that are difficult to treat and handle, and require a multiplicity of equipment and labor for performing almost duplicate operations. Additionally, the safeguarding of nuclear material of fissionable quality is imperative to avoid nuclear proliferation. For this reason, nuclear fuel reprocessors have proposed coprocessing and spiking the pure fuel forms with high-energy gamma emitters to make it practically suicidal to remove these materials from a hot cell. Because purified fuels may be pilfered before or during the fabrication stage, the gamma emitter should be capable of being incorporated at any stage of processing after the purified metals are isolated. Isotopes such as Zirconium 95, Cerium 144, and rare earth elements have been proposed for these purposes because of their physicochemical properties and availability.

The foregoing are all hazardous processes requiring remotely operable equipment and frequently the handling of dry, finely divided metal powders to create a "dusty" process. It is well known that such conditions necessitate frequent mechanical repairs and extensive decontamination work causing unwanted downtime and employee exposure to radiologically contaminated environments. Also serious problems regarding accountability and criticality of nuclear material in purified forms are thereby created.

A more recent approach to diversion resistant nuclear fuel reprocessing has been the direct coprocessing of mixed nuclear fuels by thermal decomposition or precipitation processes followed by conventional pellet formation procedures. While purified fuel forms of weapons-grade nuclear material are avoided, thereby limiting the likelihood of pilferage or diversion, these processes also involve "dusty" operations in the product conversion and compact fabrication stages. Thus, many of the same objections referenced above also apply to these processes.

While the objectionable characteristics of conventional powder processes in the product conversion and fuel fabrication stages can be eliminated through the use of wet processing schemes such as sol-gel technology, a successful coprocessing system that is directly operable on a product stream from a nuclear fuels reprocessing facility to produce loadable fuel forms has not been developed and reported in the literature to date. The principal difficulty in selecting such a system has been the development of a stable system, tolerant to impurities, producing homogenious solidified bodies of acceptable, but versatile particle size, suitable for reactor uses without inclusion of neutron captivating contaminants or exacting process and parameter controls. Experience for individual purified metal forms or for mixed metal sols to produce mixed metal forms indicate that the internal gelation mode of sol-gel technology is preferable over the other sol-gel modes for producing microspheres in the ratio of diameters of about 40:10:1 desirable for sphere-pac processes. Haas, P. A., et al, "Chemical Flowsheet Conditions For Internal Gelation to Prepare Urania Spheres," ORNL/TM-6850, Oak Ridge National Laboratory, Oak Ridge, Tenn. (1979), available from the National Technical Information Service, U.S. Department of Commerce, Springfield, Va.

An important characteristic, however, of internal gelation feeds is the acid or nitrate deficiency of the solution. Such feeds have heretofore been unknown with respect to coprocessed uranium and plutonium feeds because of the behavior of plutonium in dilute acid solutions involving valence instability, hydrolytic behavior and polymerization. This behavior can be partially controlled in individual, purified plutonium sol-gel processes through chemical additives, energy consumption, and additional waste treatment while performing tedious, time-consuming processes. However, it cannot be controlled in mixed solutions of uranium and plutonium because the ionic forms of these metals tend to oxidize each other to produce $U^{+6}$ and $Pu^{+3}$.

The principal novelty of the present invention lies in the discovery of a method for stabilizing the valence states of $U^{+6}$ and $Pu^{+4}$ in coprocessed solutions and for unexpectedly solving the unique behavioral problems of Pu in dilute nitric acid solutions. This is accomplished by what is thought to be the nitrate complexing of the plutonium through the formation of the hexanitrato plutonium complex by the uranium in solution with the plutonium donating a portion of its nitrate. Heretofore, it was not known that uranium would so act. The resultant coprocessed solution has unsurpassed tolerance to U, Pu, and fission product species contained therein. The method of this invention allows for nitrate-to-total metal ratios within the range of about 1.8 to 2.5 to systematically be prepared. Higher ratios are possible depending upon the ultimate U/Pu concentration ratio of the mixed fuel desired.

STATEMENT OF OBJECTS

It is an object of the invention to provide a method useful for preparing mixed nuclear fuels of the oxide, carbide, or carbonitride forms under controlled conditions resulting in fuel particles of suitable size, quality, and homogenity, and density for direct loading into vibration packed or pellet formation technologies based on gel-derived spherules.

It is another object to provide a process of the character mentioned which overcomes the adverse behavior of plutonium in dilute nitric acid solutions involving oxidation disproportionation, hydrolysis, and polymerization.

It is yet another object to provide a wet process, handling only liquids or free-flowing spherules, in the manufacture of mixed fuels that is amenable to simple, reliable remote operation of monitoring under virtually maintainance free conditions and minimum personnel exposure circumstances.

It is still another object to provide a wet process for making mixed fuel forms which is tolerant of selected fission product species and stabilizes the valence states of uranium and plutonium as they are found in a nuclear fuels reprocessing facility product stream to directly produce loadable fuel forms in a minimum of steps and time.

It is another object of the invention to provide a nuclear fuels spherule prepared by the above process which contains therein a uniform dispersion of uranium, plutonium, and selected fission product values in solid solution.

Additional objects, advantages, and novel features of the invention will be set forth in the description which follows, and in part will become obvious to those skilled in the art to which it pertains by examination of the following description or by practice of the disclosure. The objects and advantages of the invention may be realized and attained by means of the steps and procedures particularly pointed out in the appended claims.

A method for coprocessing nuclear fuels containing values of uranium, plutonium, and fission products comprises stabilizing a product stream from a nuclear fuels reprocessing facility by maintaining a $HNO_3$ concentration in said stream in excess of about 0.5 M to avoid metal hydrolysis, concentrating and denitrating the stabilized stream by vacuum distillation at about 40° C. and about 40 torr pressure, neutralizing this concentrated stream by addition of an amount of ammonium hydroxide sufficient to render it effectively acid deficient, and feeding said acid-deficient stream to a spherule forming operation using internal gelation processes to produce homogeneous, mixed fuel particles.

Typically, metal oxide nuclear fuels are prepared by the method of this invention, but it has sufficient versatility to be easily adapted to the production of metal carbide or metal carbonitride nuclear fuels having mixed concentrations of (U, Pu). If desired, fission products as inseparable feed stream contaminants, or added gamma emitters, may be encapsulated in the fuel bodies without any process modifications.

The article of manufacture prepared by the process of this invention is useful for making sintered spherules of various size ranges which can subsequently be vibrapacked into sphere-pac fuel elements or for preparing calcined spherules which can be subsequently cold pressed and sintered into pellets for gel-derived pellet processes.

As applied, dusty processes and tedious procedures to convert nitrate fuels to oxides and to produce loadable fuel forms are obviated by the method of this invention. The dilution of plutonium with concentrations of uranium and fission products provides a diversion resistant fuel reprocessing cycle that cannot result in proliferation of nuclear warfare without further and substantial enrichment processes of any pilfered material. Finally, solution chemistry difficulties involving uranium and plutonium concentrations in nitric acid are unexpectedly overcome by the stabilizing procedures and concentration techniques adapted herein eliminating tedious and energy-intensive processes that are not readily adaptable to nuclear fuel reprocessing facilities and the attendant employee exposures to hazardous radiation caused by operations to decontaminate, maintain, or inspect powder based processes for making nuclear fuels.

DETAILED DESCRIPTION

The process of this invention is useful for preparing virtually any nuclear fuel form including the oxides, carbides, or carbonitrides of uranium and plutonium. Since oxide fuel forms are most frequently discussed in the United States, the preparation of this form will be described herein with the understanding that other fuel forms can be prepared just as effectively by the instant method. The adaptation of process conditions or chemistries is considered within the skill of the art given the present disclosure for oxide preparations.

In accordance with this invention, a process for direct coprocessing of mixed nuclear fuels comprises the receiving of a product stream from a nuclear fuels reprocessing facility containing uranium, plutonium, and fission product values, if desired, which is nitrate stabilized and vacuum concentrated to form an acid-deficient feed solution for the preparation of green spherules by the sol-gel process. $UO_2(NO_3)_2$ and $Pu(NO_3)_4$ in the feed solution are converted to hydrous oxides during gelation and thereafter sintered to (+IV) valent metal oxide fuels containing $UO_2$ and $PuO_2$ in such a process. The sintered spherules derived thereby are suitable for fabrication into sphere-pac fuel process, or the intermediate calcined spherules are suitable for cold pressing and sintering to make pellets acceptable for gel-derived pellet processes. The method of this invention produces a nonproliferation and divergent resistant fuel cycle since uranium and plutonium are directly coprocessed eliminating purified and isolated metal streams which are subject to pilferage.

If desired, selected fission product values in amounts up to about 5 wt.% can be incorporated into the green spherules directly by including it within the feed stream or by later addition. The unexpected stabilization of the plutonium valence state and prevention of its hydrolysis accomplished by the present invention renders nitrate solutions of mixed uranium and plutonium tolerant to each other and to fission product species. Spiking of the mixed fuel spherule, as is proposed in the art to make it diversion resistant, becomes unnecessary since fission products are high gamma emitters.

An effective and highly successful process for coprocessing mixed nuclear fuel solutions is provided by the process of my invention. Sources of such solutions useful for feed in my process can typically be found in the product streams from nuclear fuel reprocessing operations. The Purex process is one such process and simulated Purex product streams are used herein to demonstrate the effectiveness of my invention to provide various size spherules by the internal gelation mode of sol-gel technology. For sphere-pac nuclear fuels, spherules of optimum diameters in three size ranges are generally required. These are about 800–1000 micrometers, 200–400 micrometers, and less than 40 micrometers. A pulsed, two-fluid nozzle is adjustable for forming spherules in all three size ranges and can be utilized successfully as the droplet formation zone herein described. However, other droplet formation means are contemplated as equivalent within my procedure and can be used just as effectively.

While the initial metal and nitric acid concentrations are not critical to the practice of this invention, the uranium-to-plutonium ratio should be suitable for a denatured, diversion resistant nuclear fuel and the nitric acid concentration should be sufficient to prevent hydrolysis of the metals or plutonium polymerization. I have found 3:1 uranium to plutonium ratios and 0.5 M $HNO_3$ sufficient for these purposes. An operating temperature of about 40° C. is preferred for this stage of the process to avoid nitrate oxidation of plutonium from the tetravalent to hexavalent state. However, the process may also be carried out at room temperature with satisfactory results. (25°–40° C.). In a typical cycle of my invention, this feed solution is vacuum concentrated to about 6 M total metal concentration by maintaining a vapor temperature and concentrated solution temperature of about 40° C. and by reducing the absolute pressure to within the range of about 10–40 Torr. This solution is introduced to a Roto-Vap vacuum concentrator which has been immersed in a constant temperature bath of about 65° C. Water and free nitric acid which are evaporated by this procedure can be treated as waste or recycled to the nuclear fuels reprocessing facility for compatible use in a subsequent cycle. During this concentration, uranium and plutonium surprisingly remain in the (+VI) and (+IV) valence states respectively, heretofore unknown for mixed nitrate solutions of these metals.

The end point of the concentration process is indicated by the precipitation of most of the $UO_2(NO_3)_2$ and by the remaining solution taking on the characteristic green color of what is believed to be the hexanitrato plutonium complex. The absence of any additional 40° C. vapor in the condensor as determined by a thermocouple installed therein also signifies the completion of this procedure. In fact, the vapor temperature for a short time before the end point will actually increase to approach a temperature of about 55° C. representing an increased temperature of the concentrated solution as it approaches the immersion bath temperature of about 65° C. Thereafter, the vapor temperature will drop to the cooling coil temperature of the inlet condenser water confirming that all vaporization has ceased.

The concentrated solution of approximately 6.0 to 7.0 M in total metal content will then be partially diluted with water to about 4.0 M metal to facilitate sampling and analysis for uranium, plutonium, and nitrate content. Such information is necessary to make a final feed adjustment to produce a desired feed composition of mixed metals. For a 75 wt.% U-25 wt.% plutonium mixed oxide fuel, a 1.0 M plutonium, 3.0 M uranium, and 2.5 to 3.0 M nitrate-to-total metal concentration must be prepared. Other predetermined weight ratios could also be prepared at this point by appropriate adjustment just as easily. For instance, I have prepared mixed fuels ranging from about 12 wt.% to 50 wt.% plutonium, balance uranium, in my process.

Metal nitrate feeds, suitably deficient in nitrates for the internal gelation mode of sol-gel technology, is prepared from these vacuum concentrated nitrate solutions after removal of excess water and nitric acid. This is accomplished by partial neutralization of the remaining nitrates through the addition of a sufficient amount of ammonium hydroxide. Aggitation is routinely required during this addition to assure uniformity of the resultant mixture. For 25 wt.% plutonium mixed fuels, the nitrate-to-total metal ratio is stoichiometrically 2.5. By selectively holding the nitrate-to-plutonium ratio at about 3.0 and varying the nitrate-to-uranium ratio within the range of about 1.5 to 1.75, I have consistently produced internal gelation feeds of 2.0 or less. Typically, ranges of nitrate-to-total metal ratios of about 1.88 to 2.06 are preferred, but ratios from about 1.5 to 2.5 are possible. The preparation of nitrate deficient solutions of coprocessed uranium and plutonium feeds has heretofore been viewed as improbable because acid-deficient plutonium feeds were thought to be impossible to create.

I have discovered that this prepared feed solution is remarkably stable for prolonged periods of time since uranium and plutonium are present and maintained in a (+VI) and (+IV) valent states as $UO_2(NO_3)_2$ and $Pu(NO_3)_4$, respectively. The uranium while being rendered nitrate deficient in my process has contributed a portion of its nitrate to stabilization of plutonium. Thus, the solution can have a prolonged storage life which was previously unknown and not expected for mixed nitrate solutions of these metals. Additionally, this solution is effectively acid deficient without actual loss of nitrate thus avoiding tediuos nitrate removal procedures.

This effectively acid-deficient solution of uranyl and plutonium nitrates is used to precipitate uranium and plutonium hydrous oxides by means of the thermal decomposition of 3.1 M hexamethylenetetramine (HMTA) solution to generate ammonia by an acid catalyzed reaction. A substoichiometric nitrate feed is necessary to provide metal ion precipitation and crystallization characteristics required for the formation of intact, homogeneous, gelled spherules without mass transfer. Premature gelation of the uranium and plutonium is prevented by maintaining the mixture below 10° C. and preferably chilled to about 0° C. Also, urea is added in a 3.1 M concentration to prevent gelation and to provide greater constituent dispersion of the mixture.

Satisfactoryr spherule products of various size ranges can be prepared for the sphere-pac technology by operating within the range of about 1.2 to 2.0 ratios for HMTA-to-total metal. This range is sufficient to accommodate impurities, process variations for spherule sizes, or other engineering considerations essential for sphere-pac processes. Lackey, W. T., et al, "Assessment of Gel-Sphere-Pac Fuel for Fast Breeder Reactors," ORNL/TM-5468 (1978), Oak Ridge National Laboratory, Oak Ridge, Tenn. I have discovered a HMTA/total metal ratio of about 1.6 produces the best spherules for gel-derived pellet processes. See for example, the process described by S. M. Tiegs, et al, in "The Sphere-Cal Process: Fabrication of Fuel Pellets from Gel Microspheres," ORNL/TM-6906 (1979), ORNL, Oak Ridge, Tenn. Copies of the foregoing publications may also be obtained from the NTIS, address given supra.

I have found that the presence of plutonium in mixed feed solutions requires longer gelation times than pure uranium alone, but this disadvantage can be off-set by utilizing a hotter gelation medium of organic liquid and higher HMTA/total metal ratios. Cocurrent contact within the gelation column of the droplet and gelation medium may also be used to obtain better heat transfer in shorter time periods. The presence of plutonium in the feed solution also enhances stability of the mixed fuel feed as compared to pure uranium solutions since it permits the preparation of a feed which is more acid deficient in the uranium component than permissible with just uranium itself.

This feed solution, normally called a chilled broth, is passed through a spherule droplet formation zone, such as a pulsed, two fluid nozzle, to form the desired size range droplet. Spherules are formed from these droplets by travel through a gelation medium maintained at a temperature within the range of about 85° to 95° C. The spherules are transported within the column by interaction of gravity and cocurrent movement of the gelation medium through said column. As the HMTA-to-metal ratio increases, the pH range will increase from about 4.0 to 6.0. Preferably, the gelation medium is a recycled, water-immiscible organic solvent. I have found silicon oils, such as Dow Corning Silicon Fluid 200, a product of Dow Corning Corporation of Midland, Mich., to be suitable for these purposes. The presence of urea in the feed mixture also enhances the formation of the necessary gel structure as the metal ions precipitate.

Gelation is complete in about 6 to 20 seconds when the gelation medium is maintained at about 90° C. and the HMTA/metal ratio varies from about 1.2 to 2.0. The lower ratios usually require longer gelation times, but the process is usually completed in less than 30 seconds. Following gelation, the green spherules are recovered from a screen collector in the bottom of the gelation column and aged for an additional 20 minutes in the same hot silicon oil formulation maintained at about 90° C. I have found that such an aging step improves the predominate urania crystallite size for pellet pressing thereby improving the overall quality of the spheroid crystallography. This procedure is also desirable for producing sphere-pac spheres but is not essential. On the other hand, gel-derived pellets cannot be routinely produced of satisfactory quality and density without hot oil aging. The spherules are washed to remove organic solvent and residual impurities such as $NH_4NO_3$, nitrates, HMTA, and possible urea-formaldehyde resins.

The wash procedure that I have adopted comprises a first wash for 15 minutes of the spherules in three consecutive 200 ml volumes of trichloroethylene to remove residual silicon oil followed by a second wash for 30 minutes with four consecutive 200 ml volumes of 3.0 M $NH_4OH$ solution. It is conceivable that these unreacted reagents and decomposition products could be further treated for recycle or, as an alternative, simply discharged to waste.

The wet spherules are dried in a flowing stream of moist air from room temperature to the range of about 70° to 90° C. over a 5 to 6 hour period.

Drying conditions of the wet spherules have been found to have a pronounced effect on the final sintered density of the loadable fuel form. Therefore, a flowing stream of moist air (400 ml/min) is used to stage dry the spherules. The first stage consists of heating the spherules from room temperature to the range of about 70° to 90° C. where they are held for a 5 to 6 hour period. Thereafter, the second stage is entered by increasing the temperature of the spherules to about 110° C. until drying is complete. This procedure has been discovered as crucial to the urania crystallite growth quality and therefore significantly effects the quality of the final fuel form. It is desirable for sphere-pac spherules and essential for good pellets.

After drying, the green spherules are calcined in a reducing atmosphere to remove volatiles and to reduce the $UO_3$ to $UO_2$. This is accomplished by heating the spherules in a flowing stream oven of 96% Ar-4% $H_2$ to about 600° C. and holding that temperature for about four hours. An inert atmosphere of argon or $CO_2$ is used to cool the calcined spherules back to room temperature. Sintering of the calcined spherules is accomplished by heating them to about 1450° C. in the same flowing stream oven and holding that temperature for about four hours followed by cooldown in argon. A heating schedule for both calcining and sintering is followed of about 100° C./hr increments from room temperature to about 600° C. followed by 300° C./hr increments from about 600° C. to about 1450° C.

In the following examples, mixed oxide spherules containing uranium and plutonium are prepared to illustrate the operability and control of the present invention over a wide range of plutonium concentrations. It should be understood, however, that other embodiments containing nuclear fuel values and selected fission products may be prepared following the general procedures described without departing from the spirit and scope of the invention. Further, it should be understood that the process conditions are not necessarily optimized and that commercial scale production processes may require higher or lower parameters of the operating conditions specified herein.

Example I

For fast reactors, plutonium contents for mixed fuels generally fall within the range of 15 to 35 weight percent. 25 wt.% plutonium, the balance uranium, is thought to be optimum and will be used herein for the purposes of illustration. A simualted, one liter purex process solution of $UO_2(NO_3)_2$ and $Pu(NO_3)_4$ containing dilute nitric acid was prepared wherein a major portion of the metal concentration was uranium (148.6 g) and a minor portion was plutonium (49.5 g). This solution was introduced into the apparatus described above and vacuum concentrated at a temperature of about 40° C. and an absolute pressure of about 40 torr. The resultant solids were diluted with about 70 ml of water to produce a solution of about 4 M total metal.

Analysis of my concentrated solution revealed that it contained 3.25 M $UO_3(NO_3)_2$, 1.00 mole $Pu(NO_3)_4$, and 10.9 M of nitrate. This concentrate was heated to about 65° C. and approximately 20 ml were pipetted into a separate container. About 6.7 ml of water and 6.1 ml of a 9.5 M $NH_4OH$ solution were added to this 20 ml concentrated solution and stirred to assure uniform dilution and dispersion of all constituents. The resultant mixture was analyzed and found to be about 2.6 M in total metal concentration or about 0.64 M plutonium and 1.99 M uranium. Forty-Four mls. of a solution containing about 3.1 M HMTA and about 3.1 M urea was cooled to about 0° C. A feed broth was then prepared by cooling the resultant metal mixture and adding it to the HMTA-urea solution followed by cooling to about 0° C. Analysis of this broth revealed an HMTA/total metal ratio of about 1.6 M and a total metal content of about 1.09 molar. By passing the broth through a droplet formation zone, drops were formed that were subsequently dispersed in a 90° C. gelation column containing Dow Corning Silicon Fluid 200. Gelation was complete within 15 seconds and the resultant sherules recovered and aged in 90° C. silicon oil for an additional 20 minutes to promote crystallite growth. No visual defects were observed in the gelled spherules, and they had a uniform and well-structured appearance.

The spherules were then washed as described above in trichloroethylene and ammonium hydroxide to remove residual contaminants. After being washed, the spherules were stage dried for 5 to 6 hours in a flowing stream of moist air maintained at about 70° C., followed by increased temperature moist air at about 110° C. until complete drying was accomplished. Examination of the dried spherules did not reveal any cracks or other surface and structural imperfections.

These spherules were then calcined to remove any remaining volatiles and to form metal oxides by reduction. This was accomplished in a 96% Ar-4% $H_2$ environment by heating the spherules to about 600° C. and holding them there for about 4 hours. Thereafter, the spherules were cooled under an argon environment to room temperature. The calcined spherules were separated into two batches.

Sintering of one batch of these spherules was performed to improve their crystal density to approach acceptable fuel quality standards. This was accomplished by heating them in a 96% Ar-4% $H_2$ environment to about 1450° C. and maintaining them there for about four hours followed by an argon environment cooldown to room temperature. The product spherules were of good appearance without any surface or structural deformities being observed. Metallographic examination of the spherules revealed a good microstructure without voids or other detrimental defects. A uniformly dispersed matrix of about 25 wt.% plutonium and about 75 wt.% uranium in solid solution was determined by appropriate examination. The spherules were found to have a crystal density of greater than 98% of the theoretical crystalline density of $(U, Pu)O_2$. Process yields for this method were determined by mass balance and found to be in excess of 95%.

A second portion of the calcined, but unsintered spherules was used in a conventional fuel fabrication process to produce pellets having 88 to 94% theoretical crystalline density after the compacts were fired to a sintering temperature of about 1450° C. The resultant pellets were of good quality, uniform dimensional precision, and without visible defects or laminations. They appeared of suitable quality for direct loading without dimensional correction required in prior art pellet formation processes.

Nuclear fuel particles prepared by the method of this invention are thus suitable for either vibra-packed fuel elements or for pelletized fuel elements. Pellet densities prepared from a feed stream of calcined spherules by standard cold-pressing and sintering techniques known in the ceramic art were discovered to have the surprising theoretical density of 88-94%. Thus, they meet or surpass accepted reactor standards of 90±1% theoretical density for loadable fuel pellets without grinding or sizing processes utilized for powder process pellets. Accordingly, prior art problems concerning nonuniform particle matrices, variant flux densities, and nonequalized thermal effects of irradiated fuels can be obviated by the products of this invention. If desired, the sintered spherules can be coated by processes known in the art to create impervious pyrolytic carbon or graphite coatings.

Example II

The procedures of Example I were repeated to demonstrate the tolerance for impurities of the products of this invention.

Fission products to discourage pilferage were added to the simulated Purex process feed stream in the following weight percents: 1.5 zirconium, 1.5 ruthenium, 0.4 cerium, and 0.4 neodymium. The plutonium weight percent was maintained at 25%, the balance uranium. Two runs were made at the nitrate-to-uranium ratios of 1.5 and 1.75. Uniformly sized microspheres of acceptable quality were easily prepared in both runs.

In both examples I and II, the plutonium was valance stabilized as ionic Pu(IV) without any difficulties encountered by high uranium concentrations or by impurities concentrations. Hence, prior art difficulties for direct coprocessing of nuclear fuels have been solved by the method of this invention.

Example III

Since uranium behavior is believed to be the key determinant of metallography and the impurities tolerance of mixed fuel systems because of its higher concentration, the crystal structure of uranium spheres prepared by the method of the present invention were studied in detail.

In a first run, spherules containing 5 wt.% cerium, neodymium, and zirconium, balance uranium, were prepared. In a second run, spherules containing 5 wt.% cerium and 2.5 wt.% ruthenium, balance uranium, were prepared. Nitrate-to-uranium ratios were maintained within the range of 1.5 to 1.75 during these tests.

The crystal morphology of the spherules thus obtained were evaluated by electron microscopicity. The x-ray diffraction pattern and electron microscopicity studies indicated uniformly dispersed values of uranium and impurities across the matrix. The crystal structure varied from small crystallites to needles and larger platelets. Further analysis indicated that crystal morphology for vibrapacked spherules does not greatly effect sintered spherule density or quality. However, spherules containing the smaller crystallites were observed to be dense and fragile resulting in reduced product yields and some decomposition problems during prolonged storage. For pellet formation, the morphology was a determinative factor, a very high population of large (2000–4000 Å) urania platelets being necessary to produce intact pellets of the required sintered density.

What is claimed is:

1. A nuclear fuel processing method comprising the steps of:
    stabilizing a product stream from a nuclear fuel reprocessing facility which stream contains both uranium and plutonium by maintaining a $HNO_3$ concentration in said stream in excess of 0.5 M to prevent hydrolysis of said metals;
    concentrating the stabilized stream by vacuum distillation at a temperature in the range of about 25° C. to about 40° C. and a pressure in the range of about 10 Torr to about 40 Torr;
    making the concentrated stream acid deficient by neutralization with ammonium hydroxide; and
    feeding the acid deficient stream to a spherule-forming operation using an internal gelation process to produce sol-gel spherules.

2. The method of claim 1 wherein the nuclear fuel comprises oxides of uranium and plutonium.

3. The method of claim 1 wherein the nuclear fuel comprises carbides of uranium and plutonium.

4. The method of claim 1 wherein the nuclear fuel comprises carbonitrides of uranium and plutonium.

* * * * *